Feb. 16, 1932.    R. N. WILLIAMS    1,845,466
AIRPLANE
Filed Feb. 19, 1931    2 Sheets-Sheet 2
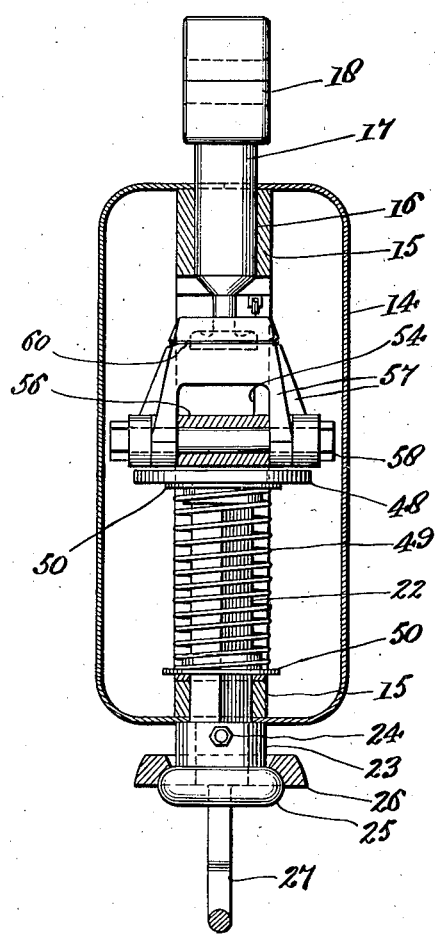
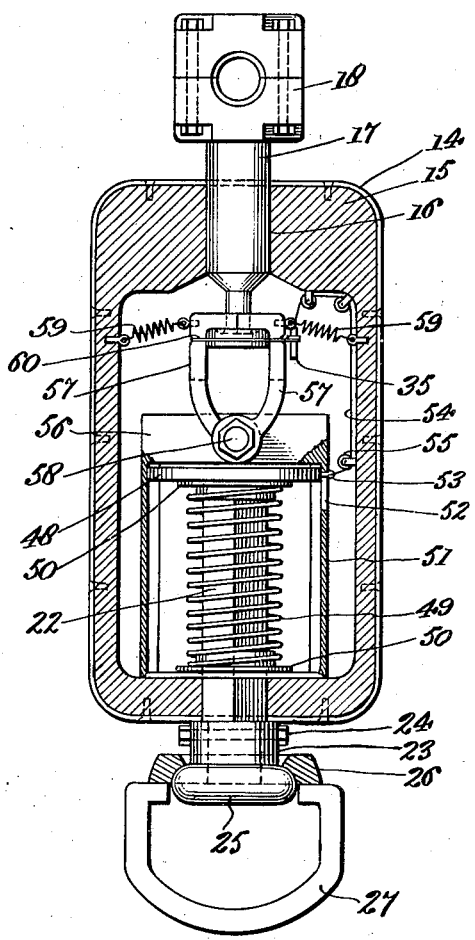
Inventor
Richard N. Williams
By Wilkinson & Mawhinney
Attorneys Patented Feb. 16, 1932

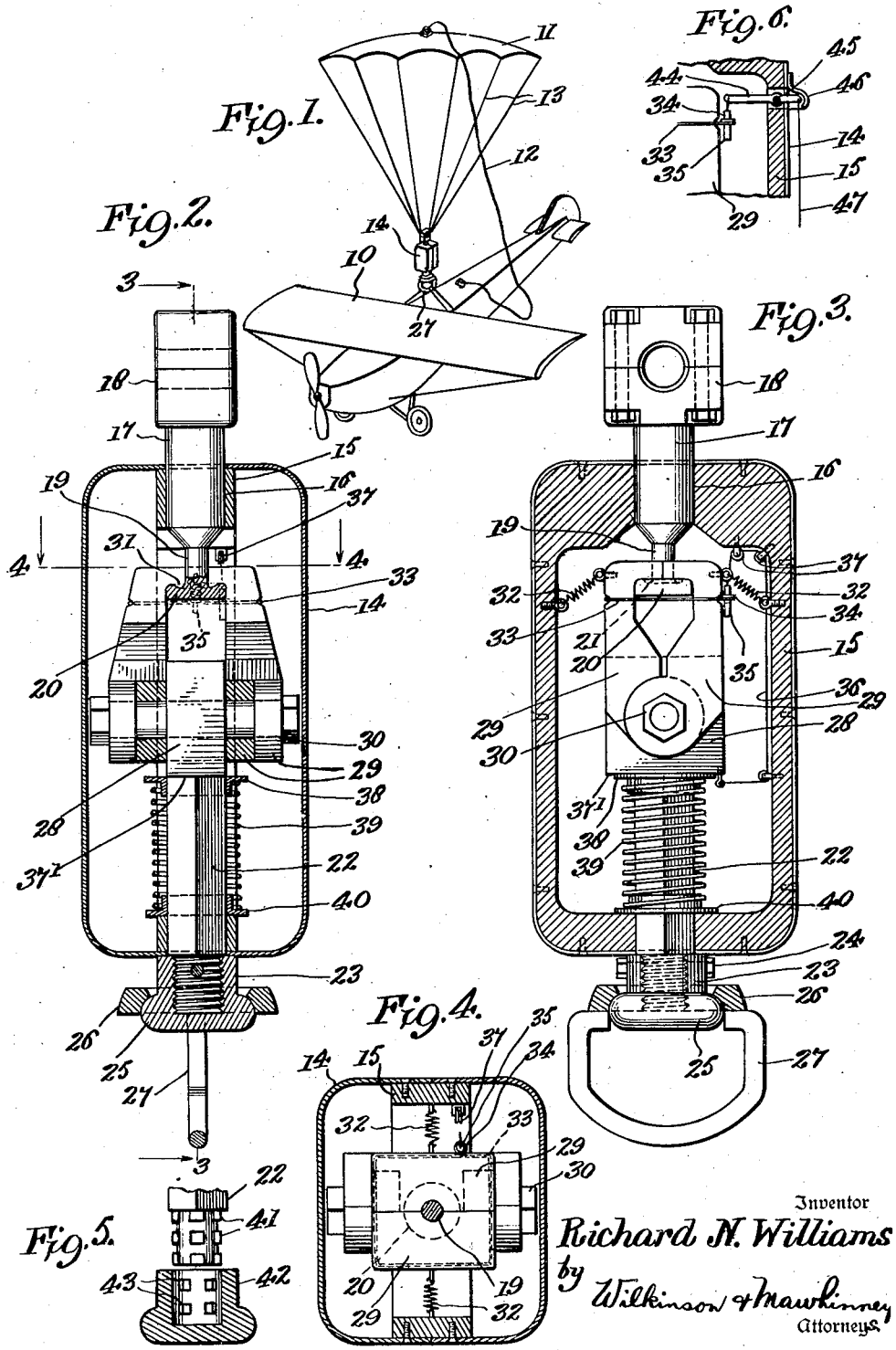

1,845,466

UNITED STATES PATENT OFFICE

RICHARD N. WILLIAMS, OF NORFOLK, VIRGINIA

AIRPLANE

Application filed February 19, 1931. Serial No. 516,982.

The present invention relates to airplanes, and more particularly to a parachute adapted for use in landing the same in case of emergency and the like.

An object of the present invention is to provide an improved releasing means for freeing the parachute from the airplane when the latter lands on the ground so that the airplane will not be injured incident to side draft of the parachute, particularly in high winds.

Another object of the present invention is to provide an airplane parachute releasing device which is automatic in action and which is adapted to free the parachute from the airplane as soon as the weight of the airplane is relieved from the shroud lines so that the parachute may collapse and roll away without dragging or injury to the airplane.

Another object of the present invention is to provide an improved connection between the upper portion of the parachute above the shrouds and the body of the parachute and the airplane so that when the shrouds are released from the airplane the parachute in blowing away from the airplane will be collapsed and at the same time will be anchored sufficiently to the airplane to prevent loss of the parachute and in such a manner to insure the proper collapsing of the parachute so that it will have practically no drag upon the airplane.

The invention has for a still further object the provision of a releasing device for parachutes from airplanes and the like which during the release and opening up of the parachute is held inoperative, and which is trapped or set in position for automatic operation by the initial taking up of the weight of the airplane by the parachute when the latter is opened so that the device cannot be accidentally released during the opening of the parachute and other initial operations in freeing the same prior to the actual taking up of the weight of the airplane by the parachute.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an airplane supported by a parachute and having the automatic releasing device and the parachute connection of the invention applied thereto.

Figure 2 is an enlarged vertical section taken through the parachute releasing device in position for connecting the parachute to the airplane.

Figure 3 is a longitudinal section taken through the same at right angles to the showing in Figure 2 and substantially on the line 3—3 of Figure 2.

Figure 4 is a transverse section taken through the upper portion of the device substantially on the line 4—4 of Figure 2.

Figure 5 is a fragmentary detail sectional view of the lower end of the device, showing a slightly modified form of connection for the swivel ring from which the airplane is suspended.

Figure 6 is a fragmentary enlarged sectional view taken through one side of the device, showing a manual release for the locking means employed.

Figure 7 is a vertical section, similar to Figure 2 but showing a slightly modified form of the device, and Figure 8 is a like view taken axially at right angles to the showing in Figure 7.

Referring now to the drawings, 10 designates an airplane or other body adapted to be supported by a parachute 11. It is of course understood that this device may be proportioned as to size and strength of parts for adapting the device to parachutes for use by aviators and other persons using the same.

The upper central portion of the body of the parachute 11 is connected by a cable 12 or other flexible element to the body portion of the airplane 10 so that when the shrouds 13 of the parachute are released from the airplane 10, the parachute 11 may collapse in a natural manner and be connected flexibly by the cable 12 to the airplane 10 in such wise that the parachute will effect practically no drag upon the airplane after the latter has landed. This insures the conserving of the parachute 11 as it may be readily recovered and is prevented from being blown away and destroyed.

In the form of the invention shown in Figures 2, 3 and 4, the releasing device comprises a frame 14 of aluminum, ship steel or any other suitable material which is light in weight and which possesses the necessary strength. This casing 14 is secured to and encloses a frame or yoke 15 which is open at its central portion and which is provided in its upper end with a bearing opening 16 in which is rotatably and slidably disposed a rod or shaft 17 provided on its upper end with a split bearing block 18 adapted for connection directly or otherwise with the shrouds 13 of the parachute. The shaft 17 at its lower end is reduced in thickness to provide a neck 19 which carries upon its lower end a circular head or disc 20 which is provided in its upper face with an annular depression or groove 21 for a purpose which will hereinafter appear. The bearing opening 16 is of such size as compared with the head 20 that the latter may freely pass upwardly and outwardly through the opening 16 when the head 20 is released.

Slidably mounted through the lower end of the frame 15 is a non-circular shaft or rod 22 and the frame 15 is provided with an opening through its lower end conforming in contour to that of the shaft or rod 22 for holding the frame 15 from turning on the shaft. The lower end of the shaft 22 is reduced and screw threaded as shown to receive thereon a correspondingly threaded collar 23 which may be locked to the shaft 22 by a cross bolt 24 engaging through registering openings in the collar and the threaded portion of the shaft 22 as shown. The lower end of the collar 23 is provided with an enlarged and rounded swivel head 25 upon which is supported a ring 26 provided with a bail 27 or the like so that the ring with its bail may freely turn upon the head 25 without turning or imparting a strain upon the shaft 22. The bail 27 is adapted for connection with the airplane 10 as shown in Figure 1, or otherwise.

The upper end of the shaft 22 is laterally enlarged to provide a lug portion 28 with flat sides, and a pair of jaws 29 forked and interfitting at their inner ends are fitted upon and against the opposite sides of the lug 28 and pivotally connected to the lug by a cross bolt 30. The jaws 29 are adapted to swing toward and from each other and extend upwardly from the lug 28. The jaws 29 are recessed near their upper ends and at their inner sides to provide a space for the reception of the head 20 while the upper meeting edges of the jaws 29 are suitably recessed to fit and engage about the opposite sides of the neck 19, the neck 19 adapted to freely turn between the jaws. The inner sides of the jaws, at their upper ends are provided with semi-circular beads 31 adapted to seat in the annular groove 21 and the walls of the groove and of the beads are rounded so as to present interfitting cam faces adapted to yield under certain pressure to free the jaws 29 from the head 20.

It will be noted that the jaws 29 are mounted on a pivot 30 which is at right angles to the medial plane of the frame 15 so that the jaws 29 when they swing outwardly and downwardly from each other approach the opposite sides of the frame and are confined therein. The frame 15 is provided in opposite sides with springs 32 which are connected to the adjacent jaws 29 and are adapted to normally exert sufficient pressure on the jaws to spread the same apart and release the head 20 when the lengthwise pressure between the jaws and the head 20 is relieved to a predetermined extent.

The jaws 29 are normally held in closed position about the head 20 by means of a bail wire 33 which surrounds the upper portions of the jaws 29, and the latter may be grooved for holding the bail 33 in correct position. The free ends of the bail are provided with eyes 34 adapted to overlap each other when the bail 33 is applied to the jaws and are held in overlapping position by means of a locking pin 35. As shown in Figures 2, 3 and 4, the locking pin 35 is connected at its upper end to a cable 36 which is carried over a plurality of rollers 37 secured to the inner side of the frame 15 and which directs the cable 36 downwardly within the side of the frame to a point near the lower end of the lug 28 so that when the latter moves downwardly in the frame the cable 36 will be pulled and will effect the drawing upwardly of the pin 35 to release the bail wire 33.

The lug 28 is a greater width in one direction than the shaft 22 and provides a shoulder 37 against which is placed a washer 38 supporting the upper end of a spring 39. The lower end of the spring 39 is seated upon a washer 40 which bears against the lower inner side of the frame 15. The spring 39 is given sufficient tension to yieldingly hold the frame 15 with its casing 14 downwardly against the collar 23, and is adapted to be compressed upon the sudden downward movement of the shaft 22 through the frame when the slack is taken up on the connection between the parachute 11 and the airplane 10.

From Figure 5 it will be noted that the lower end of the shaft 22 may be provided with a reduced portion having outstanding studs or projections 41 and the collar 42 may be provided with similar projections 43 adapted to interfit with the projections 41 so that when the collar 42 is moved up into position upon the lower end of the shaft 22 and suitably turned, the projections 41 and 43 may be welded or otherwise suitably secured together for securing the collar on the lower end of the shaft. The collar 23, or 42, is of greater diameter than that of the shaft 22 so as to provide a supporting shoulder against which the lower end of the frame 15 and its casing 14 may rest.

The operation of this form of the invention will be readily understood from the above as when the parachute 11 is open, it takes up the weight of the airplane 10, and at the moment of taking-off this weight the shaft 22 and the shaft or rod 17 are moved downwardly with a jerk through the frame 15 and compresses the spring 39. This movement pulls upon the cable 36 with the result that the locking pin 35 is pulled upwardly out of the loops 34 of the tie wire 33 at the same time that the jaws and the tie wire are moved downwardly. This insures the opening of the tie wire 33 so that the latter may readily spring away or fall away from the jaws 29.

The cam surfaces of the groove 21 and the beads 31 are sufficient to hold the head 20 in engagement with the jaws 29 as the weight of the airplane 10 upon the shaft 22 is appreciable. The springs 32 are proportioned in strength to submit to this pressure and are brought into action only when the airplane 10 reaches the ground so as to relieve the shaft 22 from the weight of the airplane. When this takes place the springs 33 are then permitted to act to spread the jaws 29 away from the head 20 so that the head 20 with the shaft 17 is free to slide upwardly through the frame 15 and be released therefrom. The parachute may now float off to one side without dragging or overturning the airplane 10 and as the shrouds 13 are relieved of the pressure, the parachute 11 tends to collapse, and this operation is aided by means of the flexible cable 12 which turns the parachute in an opposite direction from the wind so that the wind aids in the collapse of the parachute. The parachute is thus collapsed and falls to the ground a short distance from the airplane so that the parachute will not be lost and will not become fouled in trees, shrubbery or the like which may be near the place of landing of the airplane.

As a slight modification of the above described structure, the locking pin 35 may be manually released instead of depending upon the automatic releasing cable 36. In this instance the frame 15 and the casing 14 are provided in one side and at a point above the pin 35 with a lever 44 pivoted in the frame at 45 and which may project slightly through the casing. A protecting hood 46 is preferably mounted on the casing about the outer end of the lever 44 to prevent the lever from becoming fouled with shroud lines and with cables and the like forming the connection between the parachute and the airplane.

A pull cord 47 is connected to the outer end of the lever 44 and extends downwardly to the airplane so that the pilot may, at the time of landing or at any other suitable time, release the pin 35 from the loops 34 of the tie wire 33.

Referring now to the modification shown in Figures 7 and 8, the shaft 22 is provided on its upper end with a disc head 48 normally held in raised position by a spring 49 which surrounds the shaft 42 and which seats at its lower end upon the lower portion of the frame 15. Washers 50 are placed against the opposite ends of the spring 49 to provide suitable bearing members therefor. The disc head 48 slides in a guide 51 mounted in the frame 15 about the shaft 22, and the guide 51 is provided in one side with a slot 52 through which projects a pin 53 to which is attached the lower end of the pull cord 54, the latter being carried over the pulleys 55 at the inner side of the frame 15. The pull cord 54 is connected at its upper end to the locking pin 35 for releasing the latter when the disc head 48 is drawn downwardly. The spring 49 is of sufficient strength to normally maintain the head 48 in raised position and is adapted to yield only upon the sudden taking up of the weight of the airplane when the parachute 11 is initially opened.

In this instance the guide frame 51 carries a lug 56 to which is pivotally connected a pair of jaws 57 similarly constructed to the jaws 29 to engage the head 20 and which are mounted upon a bolt or pin 58 carried through the lug 56. The jaws 57 are normally urged outward by the springs 59 and are initially locked or held in position by the tie wire 60.

The modified form of the device operates in a manner similar to the first form described with the exception that the spring 49 may be constructed to yield to a greater extent than the spring 39 to permit the head 48 to move down in the guide 51 to a predetermined extent for taking up the weight of the airplane or other object or person which may be suspended from the swivel ring or bail 27.

In the modified form there is thus a yielding connection between the jaws 57 and the bail 27 while in the preferred form the entire coupling and jaw carrying device is adapted to move as a unit through the frame 15 and its casing solely by jar or impact when the parachute initially opens to take up its load. In all cases this initial relative movement of the jaws within the frame 15 is for the purpose of releasing the locking pin from the tie wire so that the jaws, either 29 or 57, may be automatically released upon the subsequent lifting of the load from the bail 27.

It is obvious that various changes and modifications may be made in the details of construction and design of the above specifically described embodiment of this invention without departing from the spirit thereof, such changes and modifications being restricted only by the scope of the following claims.

What is claimed is:—

1. A parachute releasing device comprising a pair of members, means for initially locking said members together, said members adapted for connection respectively with a parachute and an object to be supported thereby, means for releasing the locking means upon the initial taking up of the weight of the object through said members, said members having interfitting parts maintaining the members in interlocked engagement after the release of the locking means by the continued suspension of the object through the members, and final releasing means for separating the members operable upon the relief of the weight of the object from said members.

2. A releasing device for parachutes comprising a pair of members for connection respectively to a parachute and an object to be suspended therefrom, securing means for holding said members in interlocking engagement, releasing means for the securing means operable upon the taking up of the weight of the object by the parachute through the members, means for maintaining said members in interlocking position by the weight of the object, and releasing means for the members operable upon the relief of the weight of the object through the members.

3. A releasing device for parachutes comprising a jaw member adapted for connection with an object to be suspended, a pair of jaws on said member, a frame slidably mounted about the member, means for normally holding the frame in a relatively lowered position about the member, a head member slidably mounted through the frame and having a head for interlocking engagement with said jaws, engaging means for the jaws to hold the same upon said head for interlocking the jaw member and the head member, a locking pin on the frame for the holding means, a pull wire arranged between the locking pin and the jaw member for releasing the locking pin upon the relative downward movement of the jaw member through the frame, said jaws and said head having complemental cam portions held together by the weight of the object, and springs between the frame and said jaws for moving the latter from said head when the weight of the object is relieved from the jaw member.

RICHARD N. WILLIAMS.